No. 875,214. PATENTED DEC. 31, 1907.
T. ROLLEY.
TRANSOM LIFTER.
APPLICATION FILED APR. 25, 1907.
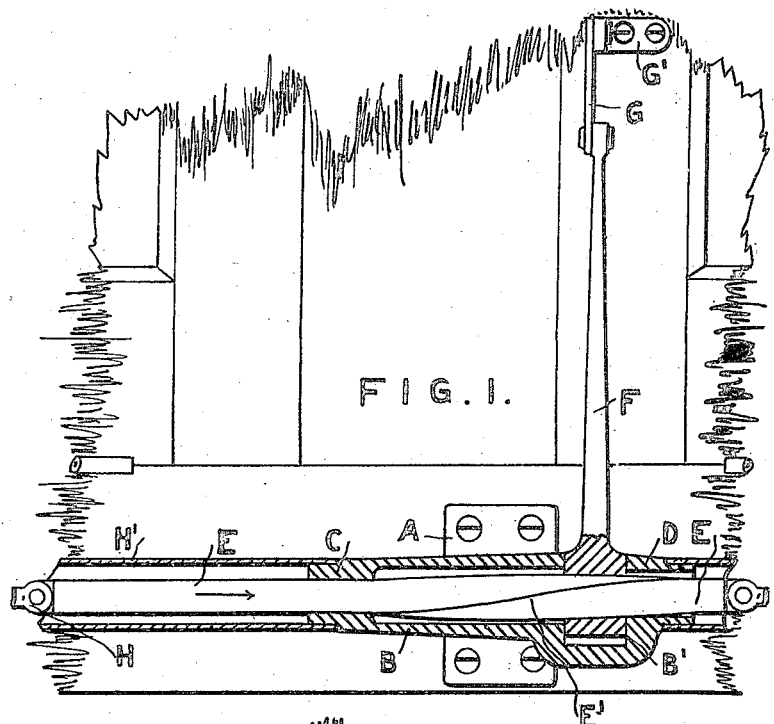
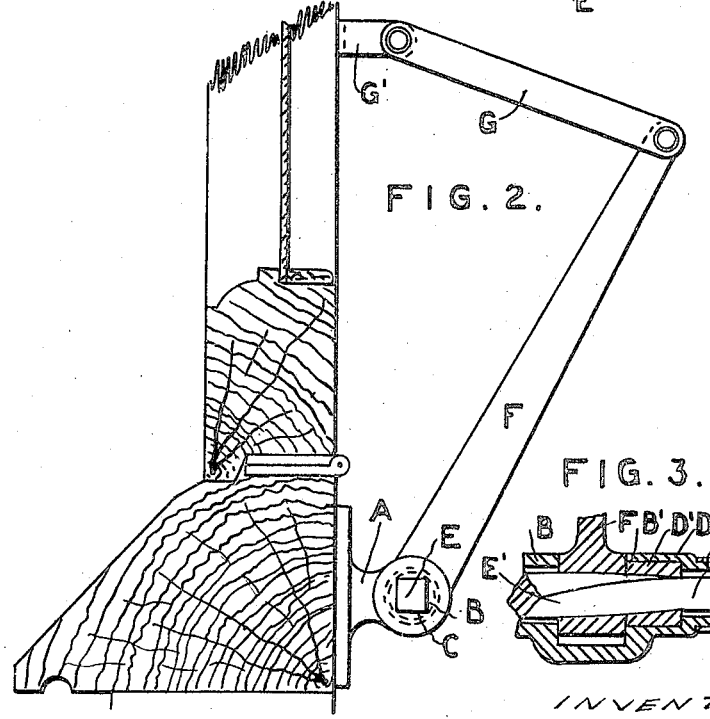

UNITED STATES PATENT OFFICE.

THOMAS ROLLEY, OF EAST BRISBANE, QUEENSLAND, AUSTRALIA.

TRANSOM-LIFTER.

No. 875,214.   Specification of Letters Patent.   Patented Dec. 31, 1907.

Application filed April 25, 1907. Serial No. 370,307.

*To all whom it may concern:*

Be it known that I, THOMAS ROLLEY, citizen of Australia, residing at Vulture street, East Brisbane, in the State of Queensland, Commonwealth of Australia, engineer, have invented new and useful Improvements in Transom-Lifters, of which the following is a specification.

This invention relates to means for opening and closing casement windows, fanlights, and other similar windows or shutters and the object is to produce an article that is simple, inexpensive, and unlikely to get out of order.

In carrying out my invention I provide a bracket (which is to be affixed adjacent to the window) having two bearings placed a short distance apart, and so constructed that a square rod or bar may slide through them but cannot rotate therein, means being provided for reciprocating such rod from within easy reach of the floor. A portion of this square rod is twisted to form a helix and on this portion rides a radial arm, prevented from moving sidewise, the movement of the helical portion of the rod being such that it causes the arm to move radially on such rod.

This invention may be fitted so as to operate a single window sash or a series of window sashes.

In order that my invention may be clearly understood I will now describe it with the aid of the accompanying drawings in which Figure 1 illustrates my invention (partly in section) as applied to opening a sash hinged at the bottom. Fig. 2 is a side elevation of same. Fig. 3 is a detail view showing an alternative arrangement for carrying the rod in one of the bearings.

A is a bracket carrying, by means of the casing B B' the bearings C, D, in which slides the square rod or bar E (a portion of which is twisted as at E' to form a helix). The bearing C is made square so as to prevent the rod or bar turning while the bearing D may be as shown in Fig. 1 fitting neatly over the angles of the square bar: it may be provided with a bushing D¹, as in Fig. 3 provided with a square hole fitting neatly on the rod and capable of rotating in said bearing, means being provided to keep the bushing in place, or it may have a square hole as at C in which case the casing at B' would be extended so as to place the bearing D beyond the travel of the helical portion E' of the rod E.

On the helical portion E' of the rod E rides the radial arm F, prevented from moving sidewise by the casing B, B'. This radial arm F is articulated to the sash by any suitable means such as by the link G and bracket G'. It will be understood that the hole in this radial arm F should be made a neat fit on the helical portion E' of the rod E so as to reduce the friction as much as possible, but in some cases I may fit the ball bearings therein so as to reduce the friction still more; as no ingenuity is required in fitting these I have not illustrated them in the drawings.

When the "openers" are used in series they would be connected up by rods, ropes or cords H, covered by coverings or casings H' and any suitable means placed within easy reach of the floor, would be provided and connected to the opener or series of openers for operating same.

The method of using my invention is as follows The "opener" comprising the bracket A, casing B B' bearings C, D, rod E, and radial arm F having been assembled together is fixed in position adjoining the windows to be operated and the arm F is then connected up to the sash in the most suitable place, as by the link G and bracket G'. If the openers are in series each rod E would be connected together as by the rods H and the opener would then be connected to the means for operating. To open the window (as shown in the drawings) the rod E is drawn to the right as indicated by the arrow, and as it moves (being prevented from turning by the square bearing C) the helical portion E' of the rod E causes the arm F to turn and so open the windows.

It will be understood that the details may be varied without departing from my invention.

Having now particularly described and ascertained the nature of my said invention, and in what manner the same is to be performed, I declare that what I claim is:—

A transom lifter comprising a reciprocating square rod having a twisted portion forming a helix, bearings for holding the rod against turning and a radial arm connected to the transom and having an opening therein through which passes the helical portion of the rod.

In testimony whereof I have signed my name to this specification in the presence of two subscribing witnesses.

THOMAS ROLLEY.

Witnesses:
ALEXANDER ANDERSON.
ARTHUR BISHOP.